United States Patent
Cottone et al.

(10) Patent No.: US 8,419,342 B2
(45) Date of Patent: Apr. 16, 2013

(54) DEVICE AND METHOD FOR TRANSFERRING PRODUCT STACKS

(75) Inventors: Norbert Cottone, Zusmarshausen (DE); Martin Peghini, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 508 days.

(21) Appl. No.: 12/666,584

(22) PCT Filed: Jun. 19, 2008

(86) PCT No.: PCT/EP2008/004912
§ 371 (c)(1),
(2), (4) Date: Dec. 23, 2009

(87) PCT Pub. No.: WO2009/000454
PCT Pub. Date: Dec. 31, 2008

(65) Prior Publication Data
US 2010/0189537 A1    Jul. 29, 2010

(30) Foreign Application Priority Data
Jun. 26, 2007    (EP) .......................... 10 2007 029 551

(51) Int. Cl.
*B65G 47/90* (2006.01)
*B65G 47/82* (2006.01)

(52) U.S. Cl.
USPC ..................... 414/790; 414/790.2; 414/790.3; 414/416.09; 294/87.1; 294/99.1

(58) Field of Classification Search ............... 294/81.52, 294/86.4, 87.1, 99.1; 414/15, 416.03, 416.04, 414/416.09, 416.1, 416.11, 416.12, 591, 414/704, 789.9, 790.2, 908, 910; 425/403.1, 425/453; 53/147, 148, 443, 444
See application file for complete search history.

(56) References Cited

U.S. PATENT DOCUMENTS

| 2,692,177 A * | 10/1954 | Larsen ............................. 312/71 |
| 3,926,382 A * | 12/1975 | Sieurin et al. ................. 242/362 |
| 4,132,319 A * | 1/1979 | Padovani .................... 414/796.1 |
| 5,015,139 A * | 5/1991 | Baur ............................. 414/281 |
| 6,439,828 B1 * | 8/2002 | Lauermann ............... 414/788.2 |
| 6,663,100 B2 * | 12/2003 | Crowley ........................ 271/165 |
| 6,851,918 B2 * | 2/2005 | Padovani ....................... 414/790 |
| 2002/0110440 A1 | 8/2002 | Padovani |
| 2005/0193687 A1* | 9/2005 | Tosa ............................... 53/399 |
| 2007/0059152 A1* | 3/2007 | Cottone .................... 414/788.2 |
| 2008/0031719 A1 | 2/2008 | Kimmig et al. |
| 2010/0189537 A1* | 7/2010 | Cottone et al. ............. 414/788.9 |

FOREIGN PATENT DOCUMENTS

| DE | 29608477 U1 * | 9/1997 |
| EP | 1232970 A1 * | 8/2002 |
| WO | WO 2005061353 A2 * | 7/2005 |

* cited by examiner

*Primary Examiner* — Gregory Adams
(74) *Attorney, Agent, or Firm* — Schiff Hardin LLP (57) ABSTRACT

A transfer device for transferring product stacks has a connecting element for connecting the transfer device to a transport device, and the transfer device has a number of receiver regions therein, that each receive a product stack. Each receiver region has guide elements with spring-loaded closure elements, and a plate that is movable in a spring-loaded manner toward the closing elements along the direction of the guide elements. When the transfer device with the product stacks therein reaches its transfer destination, the product stacks are pushed from the transfer device by the plates by spring force.

9 Claims, 11 Drawing Sheets

DEVICE AND METHOD FOR TRANSFERRING PRODUCT STACKS

BACKGROUND OF THE INVENTION

1. Field of the Invention

The invention concerns a device and a method to transfer product stacks.

2. Description of the Prior Art

The manufacturing of plastic containers (such as bowls, covers and shells) normally ensues in a machine cycle in a two-dimensional pattern or a product matrix. The products produced in a machine cycle can then be inserted into stacking shafts. The manufacturing of the next product series subsequently ensues in a product matrix. These products are also again inserted into the stacking shaft etc. until these are filled. Such a stacking shaft is normally a very simple bar stock carrier. The stack formation can ensue either horizontally, at an angle or vertically. The stack is discharged via a lifter mechanism or a blade and passed to a worker for further relaying. In the next work step, the product stack is either packaged directly in a carton or supplied beforehand to a shrink-wrapping machine to wrap the individual product stacks in film, and is subsequently packaged in a box.

The action of the packing and repacking the product stack presently normally ensues by hand. In particular if the product stack is shifted into horizontal stack magazines, such as by means of a blade, it can occur that the product stack falls apart, such that in addition to handling the stack a worker must first correct this. Because the product stack is discharged and additionally processed or packaged by hand, the maximum stack height is limited since otherwise the danger exists of such a product stack breaking apart. The same problem also occurs in vertical stack cages. Here the stack is transferred row by row or block by block onto a conveyer belt via a separate lifter mechanism after reaching a specific stack quantity. Here as well, there is a risk that the stacks will fall apart. The conveyer belt additionally serves as a buffer storage. After discharging the stacks, these are supplied to a packing machine that shrink-wraps the individual product stacks with a film. The wrapped product stacks are then likewise manually packaged.

It is disadvantageous that the relaying and the packaging of such product stacks cannot ensue in a fully automated manner. The fact that a number of different products for which the shaping, punching and discharging tools are to be refitted are produced on such shaping machines also contributes to this disadvantage.

Although it is already known to transfer product stacks vertically from a stack magazine into a rigid receptacle in the form of an external stack cage or grabber (WO 2005/061353 A2, WO 2006/027053 A1), a flexible, fully automatic additional processing of product stacks in the aforementioned sense is still not also possible with this.

SUMMARY OF THE INVENTION

The invention is therefore based on the object to enable a fully automatic relaying of product stacks, in particular of molded plastic products.

According to the invention, this object is achieved by a device of the aforementioned type, with a discharge station such as a deep-draw machine, a receiving station such as a packing machine, and with a transfer device, the latter with a connection element to connect the device with a transport device, with multiple receiver regions for product stacks that are limited by guide elements provided with spring-loaded closure elements, and with plates to be moved in the receiver regions on the closure elements in a spring-loaded manner along the direction of the guide elements.

The closure elements are pressed by spring-loading against a stop in a closed position, by which a movement of the product stack out of the transfer device is prevented.

In a preferred embodiment of the transfer device according to the invention the guide elements are arranged near the axes of symmetry of the receiving regions, in particular they are arranged on the axes of symmetry. It is thus possible to have the transfer device engage in the manner of a comb in a stack magazine at a discharge station, in which stack magazine the guide rods are typically arranged at corner or edge regions.

In a further embodiment the plates are spring-loaded by means of sheathed cables directed deflection rollers and connected with a tension spring arranged in a floor area, and the plates furthermore have engagement elements to engage external sliders and the engagement elements project beyond the outer contour of the transfer device, in particular releasing elements are associated with the closure elements of the transfer device. In this embodiment a discharge of the products to a container or receiver station for the products can be supported by the action of the spring-loaded plate and release of the closure elements. In a further version, the transfer device according to the invention can possess side walls that surround it.

The above object also is achieved in accordance with the invention by a transfer device with the described features that receives product stacks from a transfer device, the transfer device is characterized by releasing elements associated with the closure elements of the transfer device.

The above object also is achieved according to the invention by a method wherein elastically pretensioned closure elements holding the product stack in the transfer device are released by releasing elements provided at the receiver station in order to release the product stack, and the product stacks are slid out of the transfer device by plates under elastic force.

The plates under elastic force are primarily provided to secure the product stacks upon insertion into the transfer device at the deep-draw machine and only assist in the ejection of the products. The ejection ensues by external sliders.

In an embodiment the ejection is assisted by action of at least one slider provided at the receiving station, and in particular the at least one slider engages with outer engagement elements connected with plates sliding out the product stack.

The transfer of the product stack from the transfer device for additional processing (for example for packaging in a packing station) ensues at a receiving station to receive the product stack, which is characterized by releasing elements associated with the closure elements of the transfer device. At least one slider associated with the shiftable plates is preferably provided, the at least one slider engaging the engagement elements of the transfer device.

The device with a discharge device, a receiving station and a transfer device designed according to the invention as in the preceding is preferably formed as a manipulation apparatus (such as a robot) to move the transfer device between the discharge station and the receiving station.

In accordance with the invention (in particular the embodiment of the transfer device according to the invention) it is possible to automatically take up product stacks not only in vertical alignment but also in any alignment (i.e. also horizontal or angled alignment) from the production machine or, respectively, its discharge device, for example in the form of stack magazines and to supply them to an—automatic—further processing. According to the invention, the process can operate in non-combed or combed manner, wherein in the last cited case an additional slider at the discharge station can be omitted if a coupling between the transfer device and a transport mechanism (such as a robot) is maintained.

A combing magazine offers the advantage that it can be realized very simply and also can be continuously filled. However, the entire product stack must be picked up after the last machine cycle or between two successive machine cycles. For this purpose, given decoupling of the transfer device from a robot, a type of barrier or spacer can be introduced into a stack after reaching the required product count, so the discharge and the removal of the finished product stack can be divorced from the machine cycle. In the case of a non-combing stack magazine there is the difficulty in the transfer of the stack magazine therefrom into the transfer device, if the stack is to be completely transferred during a single machine cycle, that this must occur faster the higher the stack, so the requirements for the transferrer are increased.

In accordance with the invention it is possible to fulfill different requirements of production and to satisfy these, in particular with regard to throughput and capacity, flexibility and reliability.

Furthermore, within the scope of the invention it is possible to achieve a one-to-one association between production machine and additional processing, in particular to associate only one packing machine given a production machine with high capacities or even multiple production machines, and thereby to provide a linear axis for the movement manipulation apparatus bearing a transfer device according to the invention between the individual production machines and towards the machine for additional processing.

In particular with such a multi-machine loading the transfer device is decoupled in the production machine and/or additional processing machine/packing machine from a manipulation apparatus transporting it and there directly serves as a stack magazine. Alternatively, it can be placed next to or above a stationary stack magazine. This is in particular in the case in which different products for which different transfer devices are required are produced from multiple machines. Such a manipulation apparatus can take on additional transport tasks for the further production machines. The transfer devices can also be fashioned differently in terms of their stack height.

If emptying of the transfer device should occur quickly at the machine for additional processing, this transfer device can remain docked to the transport device (such as the manipulation apparatus), and this transport device can subsequently bring the transfer device back to a corresponding production machine. Alternatively, the manipulation apparatus can separate the transfer device at the machine for additional processing and, during the emptying of the transfer device, pick up an already-emptied transfer device already located there and bring it back to the associated production machine, and may possibly take an additional stack from a different production machine back to the machine for further processing.

In a preferred embodiment, a manipulation apparatus or a robot of the device can be fashioned with two coupling points for transfer devices.

DESCRIPTION OF THE PREFERRED EMBODIMENTS

The invention initially contains a transfer device 1 to transfer of product stacks from products produced in a deep-draw machine (for instance bowl stacks or the like), i.e. to receive the stack from the deep-draw machine, to transport the stack to a processing machine for further processing (for instance for packing and to discharge the stack to a machine for further processing (for instance a packing machine) in which the individual stacks are packed in plastic film sleeves, for example.

In the shown exemplary embodiment the transfer device 1 according to the invention is fashioned like a box, with a base 2 as well as longitudinal and transverse walls 3, 4 as side walls, while the sixth side of the transfer device 1 (opposite the base 2) is open, and the product stack 5 can be received and dispensed through this open side.

The base 2 and the side walls 3, 4 are provided with openings therein.

Slots 4.1 are provided in the side walls 4, in which slits slots 4.1 engagement elements for external sliders are directed, the engagement elements being connected with plates 12 that can be displaced in the transfer device 1 in the length direction of the guide elements 8, 9. The transfer device 1 has axes of symmetry A and B and the guide elements 8, 9 can en arranged near thereto.

A connection unit 6 in the form of a tool exchanger is provided on the outside of the base 2, by means of which tool exchanger the transfer device according to the invention can be accepted by or decoupled from a transport device (for instance a manipulation apparatus), such as the hand flange of a robot.

Inside the transfer device 1 according to the invention are multiple receiver regions (in the embodiment of FIGS. 1-6 there are sixteen receiver regions 7) for the product stacks 5 that are bounded by rod-shaped guide elements 8, 9, wherein closure elements 10 that can each be pivoted on an axle 10.1 are located at the free ends of the guide elements 8 that face away from the base 2. The closure elements 10 are—in their closed position shown in FIGS. 1, 3, 4, and 6—pressed in a spring-loaded manner by the force of a spring 10.3 against a stop (not shown). In this closed position a nose 10.2 of the closure elements 10 engages under the edge 5.1 of the frontmost of the products forming the product stack 5.

In the shown embodiment, two guide elements 8 fashioned in such a manner are associated with one side of the product stack 5, and only one is associated with the respective product stack on the other side.

In this preferred embodiment, the guide elements 9 leading the product stacks towards their other sides possess no such closure elements engaging below the products.

Figure 1:
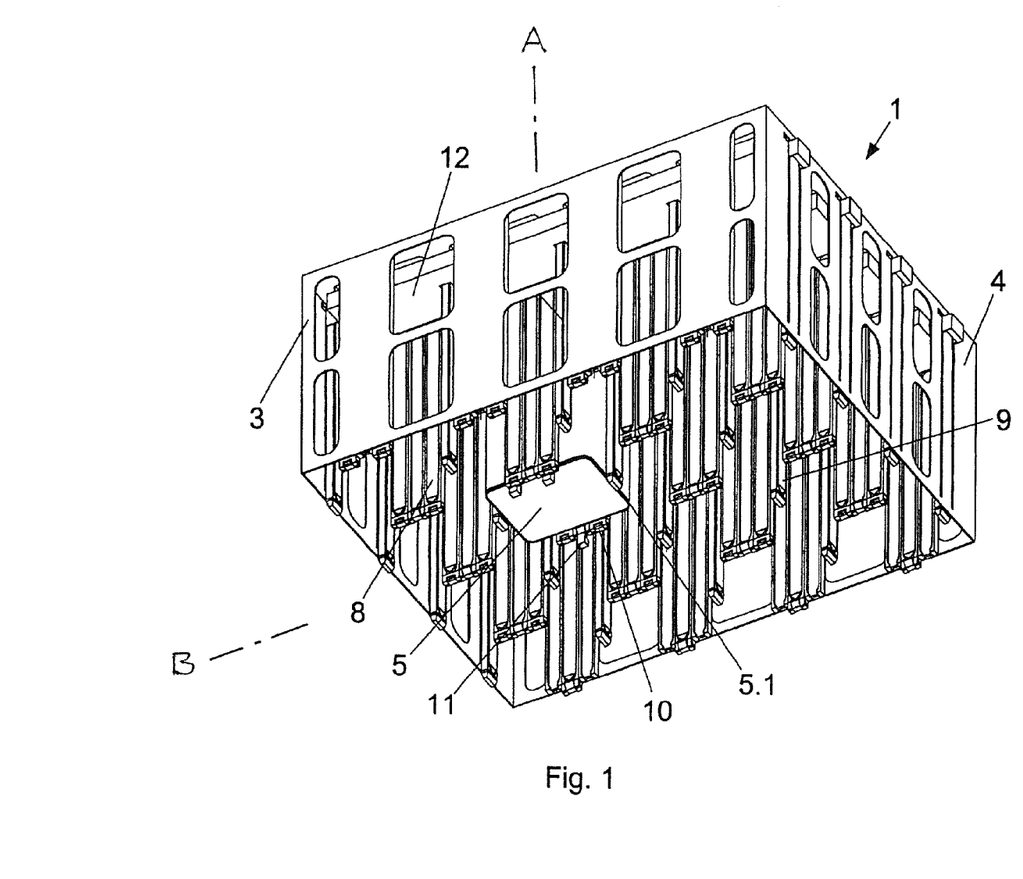
FIG. 1 is a perspective representation of a transfer device as viewed from the side of the closure elements of the transfer device.
Figure 2:
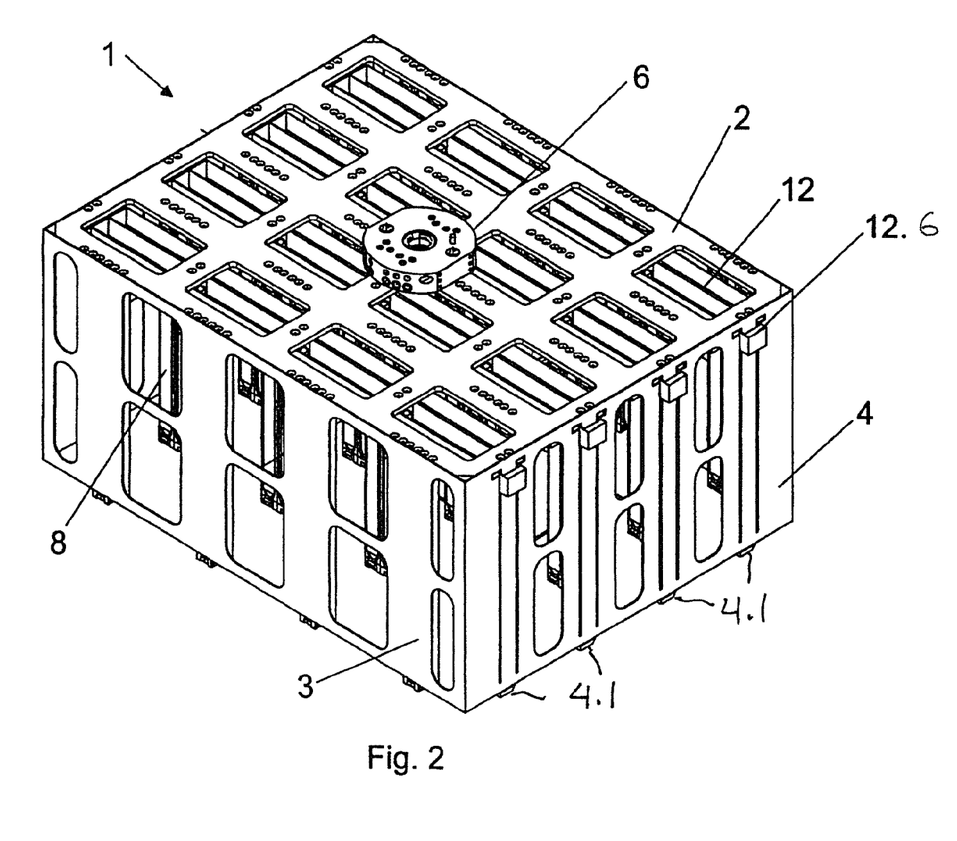
FIG. 2 is a perspective rear view (flange-side) representation of the transfer device.
Figure 3:
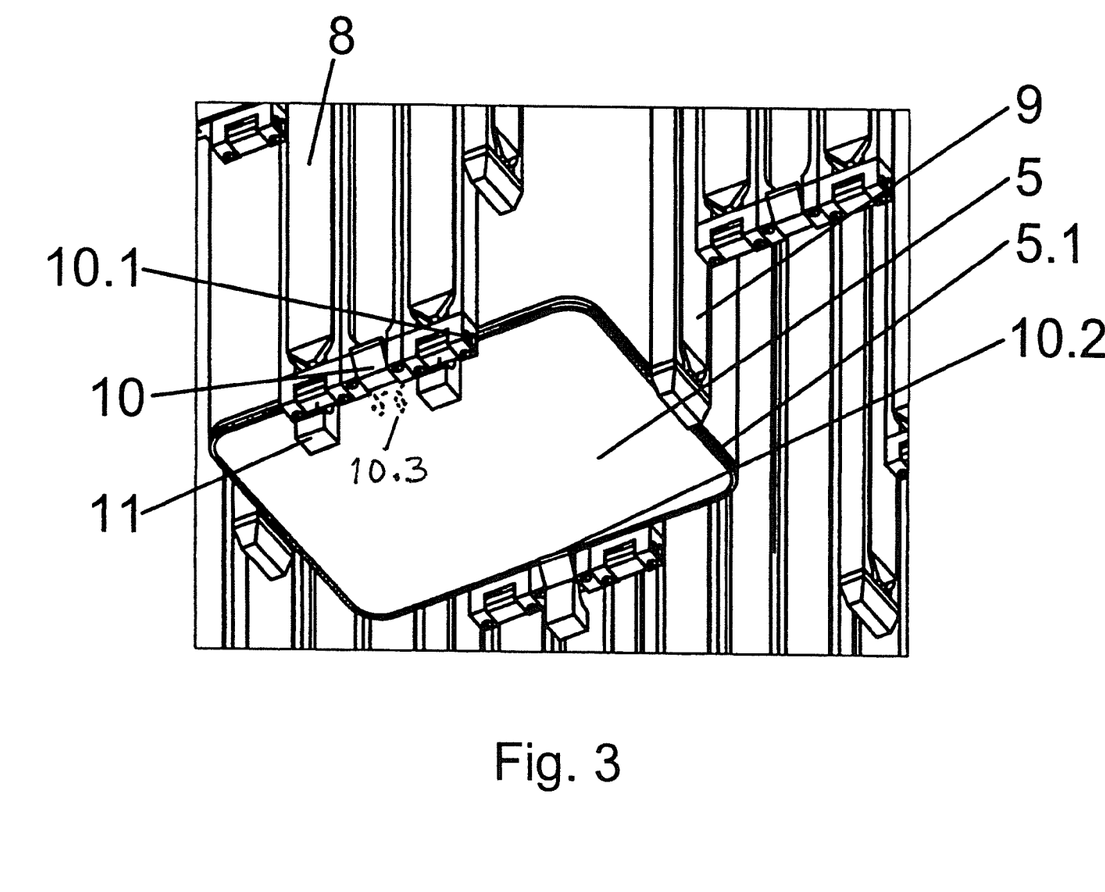
FIG. 3 is an enlarged detail presentation of the transfer device.
Figure 4:
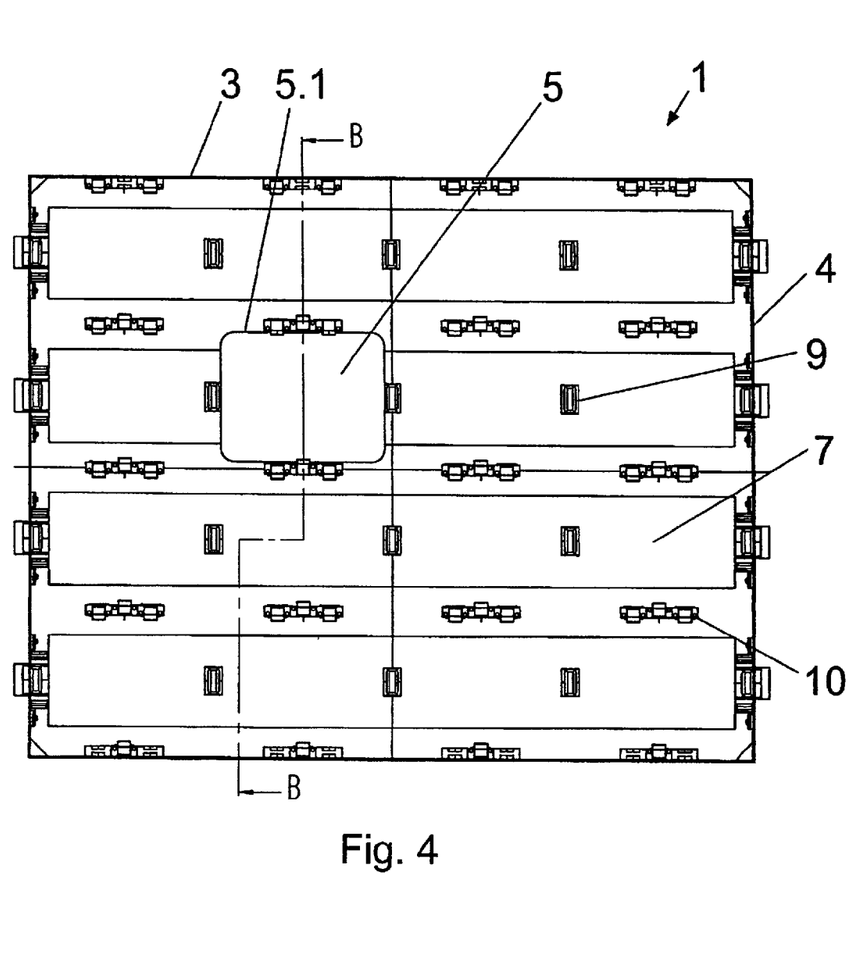
FIG. 4 is a plan view of the transfer device from its open side or, respectively, the side of the closure elements.
Figure 5:
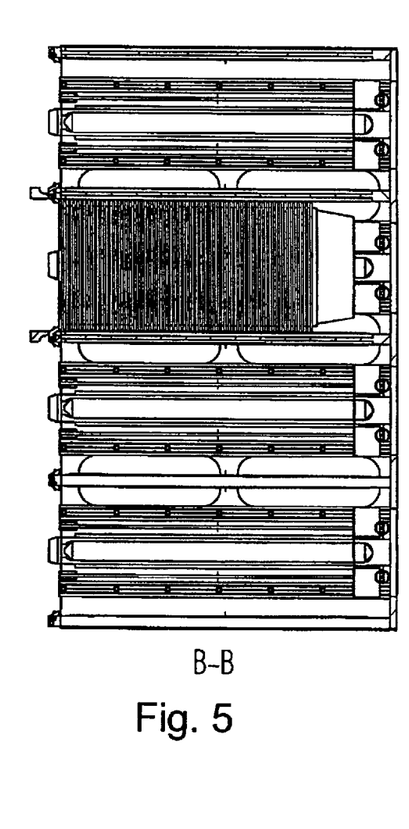
FIG. 5 is a section corresponding to A-A of FIG. 4.

Furthermore, for illustration releasing units 11 are shown in the drawings, in particular in FIGS. 1, 3, which releasing units 11 are, however, not part of the transfer device 1 but rather are arranged stationary at the discharge stations for the product rods for the product stacks 5 and there can be activated to release the product stacks 5. They press on the closure elements 10 so that each is pivoted in its axis 10.1 so the nose 10.2 retreats from the edge region 5.1 of the product of the product stack 5 and accordingly releases the product and the entire product stack so that it can be removed from the transfer unit. Insofar as the alignments of the stacks 5 or of the guide elements 8, 9 has a vertical component (downward), this can take place under the force of gravity. Plates 12 are additionally provided on the base side of the product stack 5, and can initially be displaced into the region of the base 2. The plates 12 are likewise advantageously elastically held in this position shown in FIGS. 1 and 2 and can be displaced along the guide elements 8, 9 towards their free ends by means of external sliders 16.2 operated by an electrical or pneumatic drive 13 likewise provided (opposite the transfer device 1) at the receiver station (FIG. 10) in order to actively slide off the product stacks upon ejection of the product stacks 5 from the transfer devices 1, and to act as a pressure pad during the acceptance of the products in the deep-draw machine in order to ensure that the product stacks formed there do not fall apart and that the uppermost product does not rotate or tilt.

It is significant to the invention, and results from the preceding, which the transfer device possesses or requires no active units of its own but rather is fashioned to be entirely passive. Movements of its elements—closure elements 10, plates 12—are produced exclusively by external elements or even by elastic force (return into the initial position). Accordingly, no active electrical, pneumatic or hydraulic devices are required at the transfer device itself, and accordingly are not even present in the embodiment that is shown and explained. However, in principle it would also be possible to provide corresponding active elements at the transfer device itself.

Figure 6:
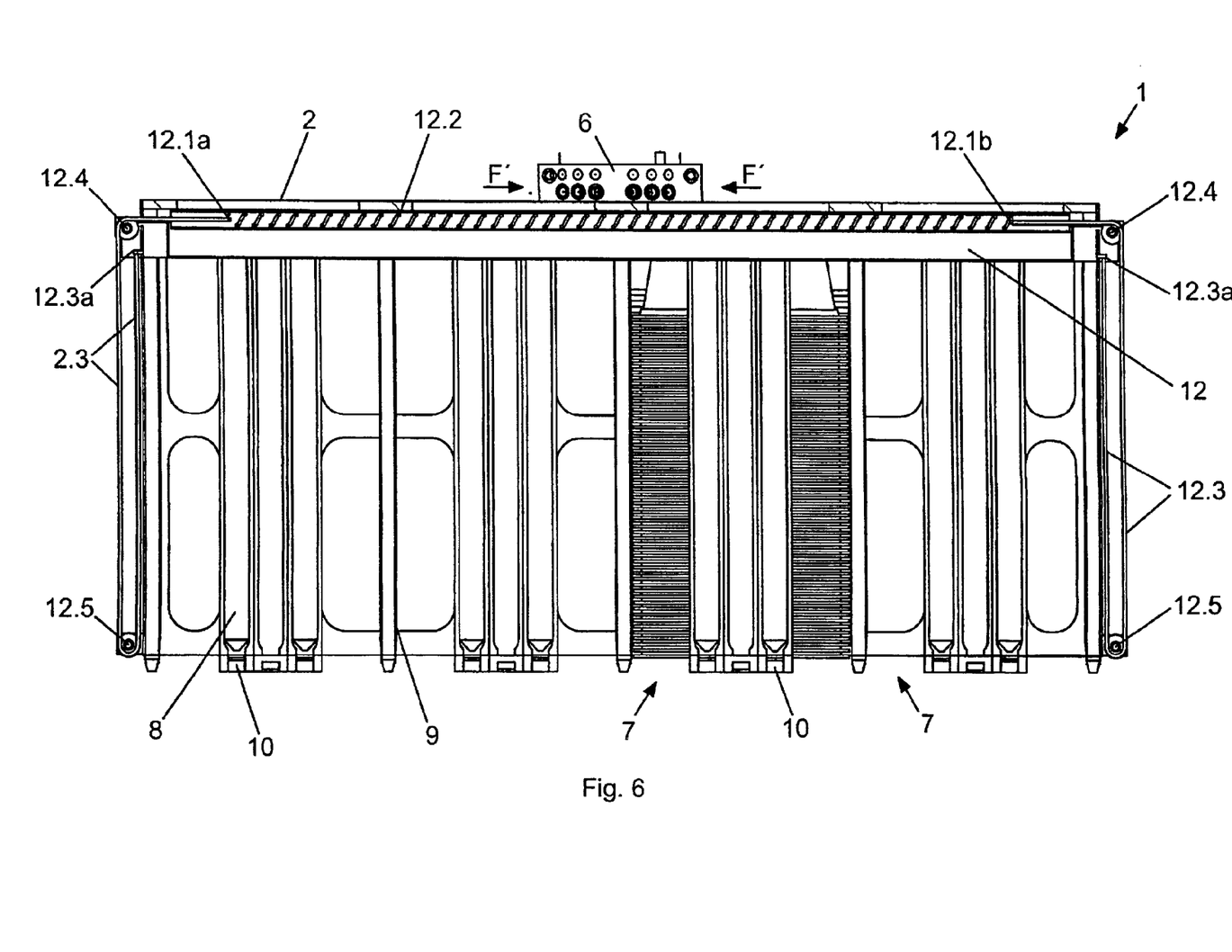
FIG. 6 is a longitudinal section through a transfer device.

FIG. 6 shows a section through a transfer device 1 according to the invention. It is clear that a respective tension spring 12.2 that can be encapsulated in a tube (not shown) is arranged between the outer base 2 and the movable plate 12 that serves as a pressure pad and slider plate, wherein such a plate 12 is respectively associated with a respective product stack row. The ends 12.1a and 12.1b of the draw spring 12.2 are connected with sheathed cables 12.3 whose ends 12.3a that face away engage at the movable plate 12. The sheathed cables 12.3 are deflected via deflection rollers 12.4 and 12.5, wherein the first deflection is by 90°, the second by 180°.

A force is thus exerted on the plates 12 in the direction of the arrow F due to the force of the spring 12.2 in the direction of the arrow F', such that these plates 12 are moved in the direction of the free ends of the guide elements 8, 9 and elastically held there if no product stack is located in the transfer device 1. If products are shifted into the receiving regions 7, the corresponding plate 12 is pressed back towards the base 2, counter to the effect of the draw spring 12.2. Due to the closure elements 10 holding back an inserted product stack 5, the plate 12 is held at a position corresponding to the level of the stack 5.

Figure 10:
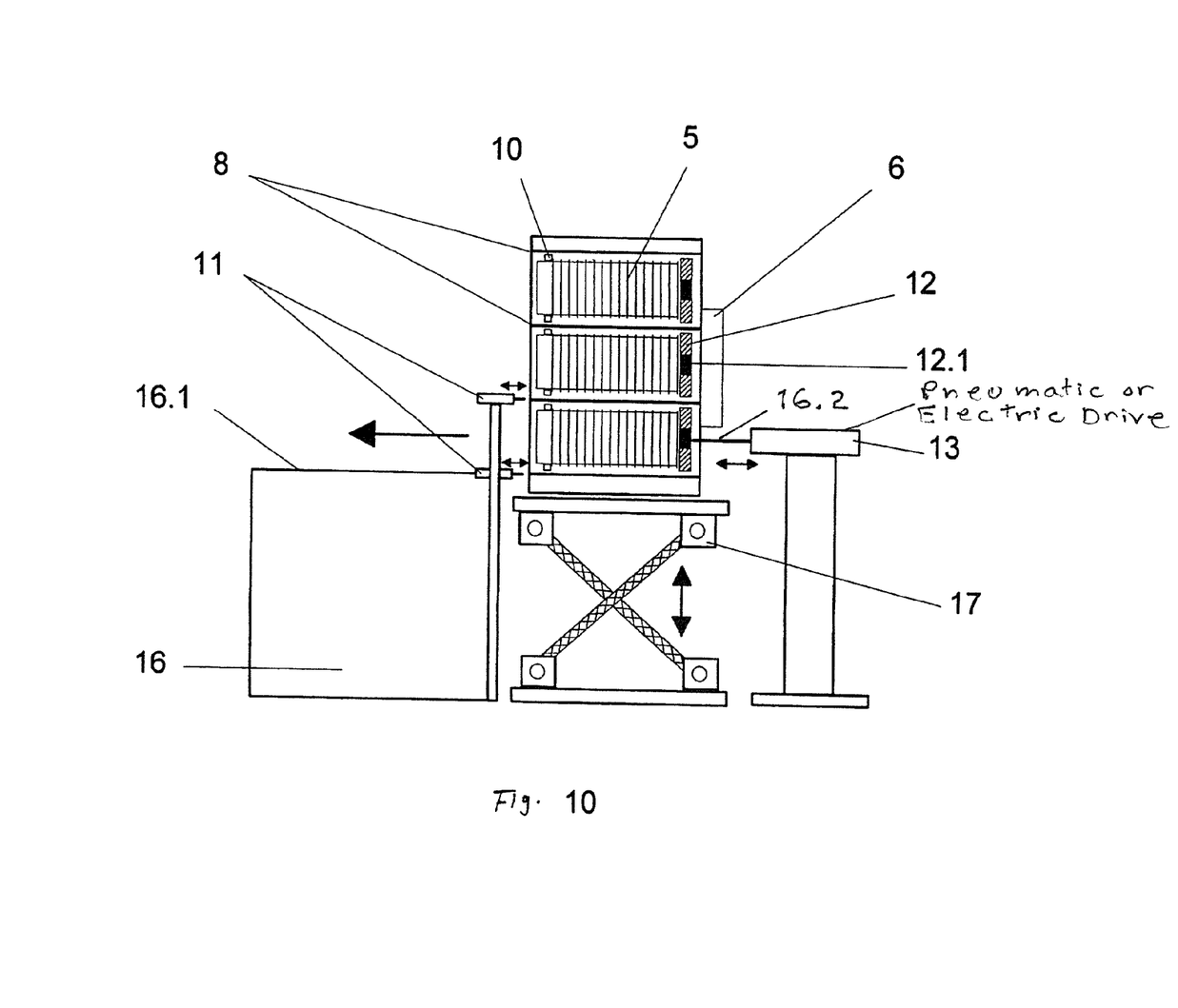
FIG. 10 is a presentation of a horizontal transfer of product stacks from the transfer device to a packing machine.

If, after transport of the transfer device 1 to a discharge station, the closure elements 10 are unlocked by releasing elements there and therefore release the product stack 5, these can be slid out of the transfer device 1 under the effect of the spring 12.2, in particular given the vertical design shown in FIG. 6. In particular when the stacks 5 is not vertical but rather are arranged at an angle or horizontally, such a sliding can be assisted by electrically or pneumatically actuated sliders engaging the plates 12 at the projecting noses 12.1 (FIG. 10).

Figure 7A:
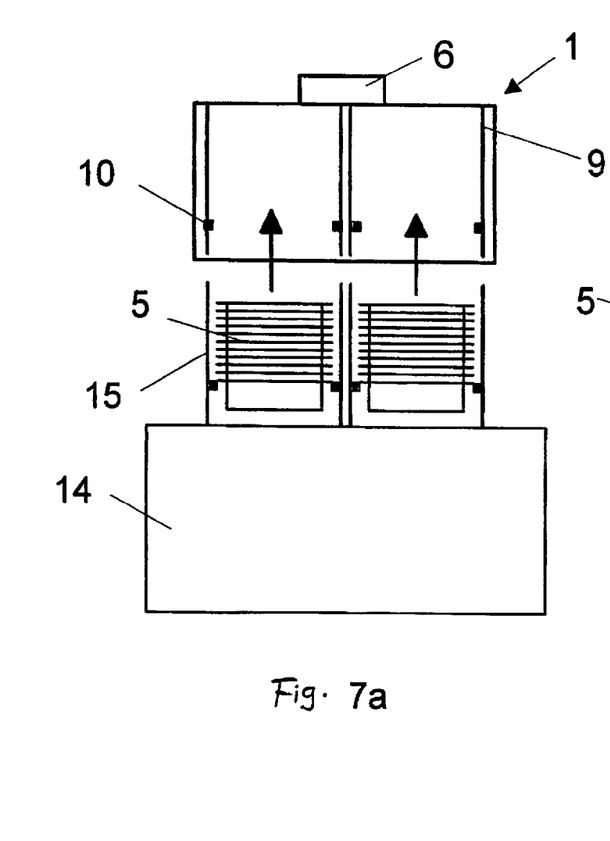
FIG. 7a is the presentation of the transfer of product stacks from a production machine (for instance a deep-draw machine) in a non-combed manner with a transfer device.
Figure 7B:
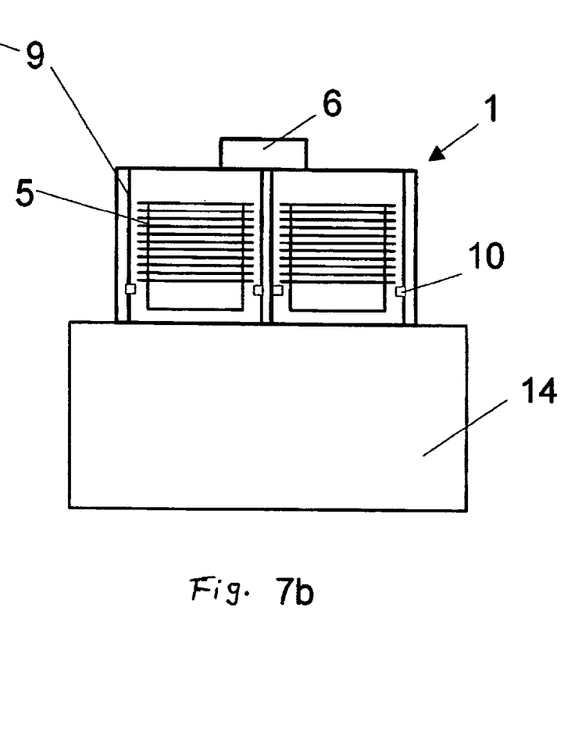
FIG. 7b is the presentation of the transfer of product stacks from a production machine (for instance a deep-draw machine) in combed manner with a transfer device.

FIGS. 7a and 7b schematically show two possibilities to receive product stacks 5 in transfer devices 1 according to the invention. A production machine 14, for instance a plastic deep-draw machine that produces (for example) deep-drawn plastic products such as plastic bowls or the like, which are stacked as stacks 5 in stack magazines 15.

In the embodiment of FIG. 7a, the transfer device 1 according to the invention is arranged above the stack magazine 15, for example is brought there by a robot engaging at its connection unit 6, and after production of a desired number of products in product stacks these are slid out of the stack magazines 15 into the transfer device 1 according to the invention by sliders 16.2 (shown in FIG. 10) corresponding to the shown arrows, wherein said product stacks press the closure elements 10 (which are borne elastically such that they can pivot) to the side upon insertion until these then engage below the edge of the lowermost product of the product stack 5. The transfer device 1 with the accommodated product stacks 5 is subsequently transported to a processing station (FIG. 10).

In the embodiment of FIG. 7b, the transfer device 1 according to the invention is driven in a comb-like manner into the stack magazines present at the production machine 14. Upon insertion of respective finished products, closure elements 10 that are elastically supported such that they can pivot, are respectively pivoted or pressed to the side until they in turn engage below the edge of the lowermost product of the product stack 5. The transfer device 1 with stacked product stacks 5 can likewise subsequently be transported for additional processing. The separation of a finished product stack 5 to be dispensed from additional inserted products is described in the following using FIGS. 8a through 9b.

Figure 8A:
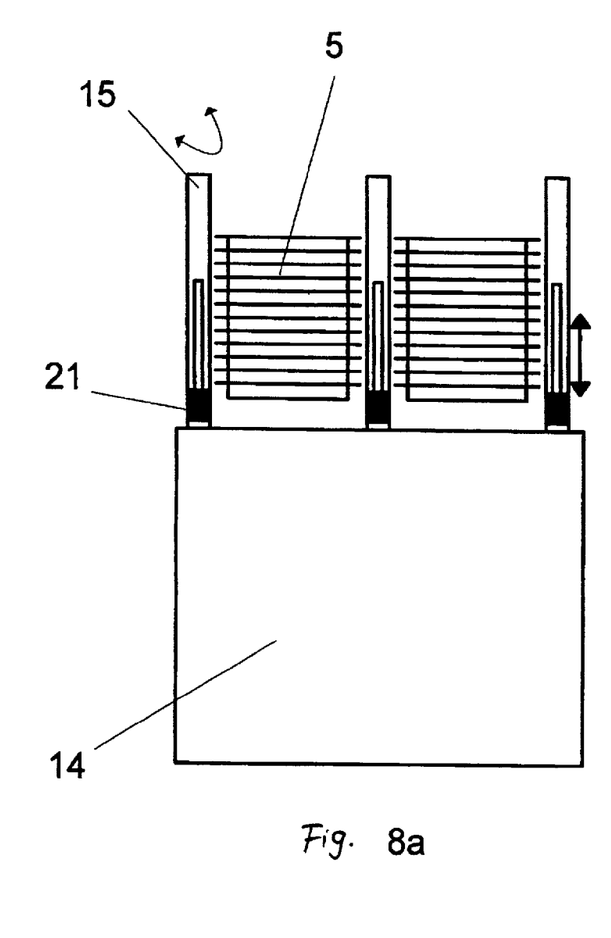
FIGS. 8a and 8b are schematic detail views of a stationary stack magazine with pivotable barriers to separate a product stack to be picked up by the transfer device from additional products stacked in the stack magazine.
Figure 8B:
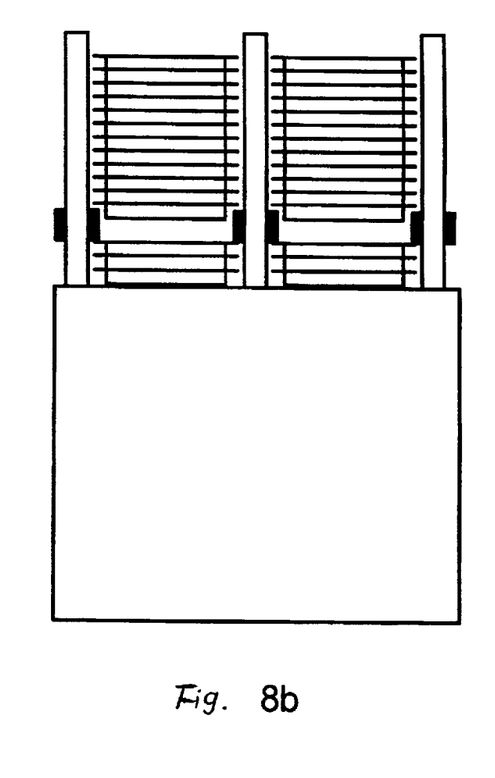
Figure 9A:
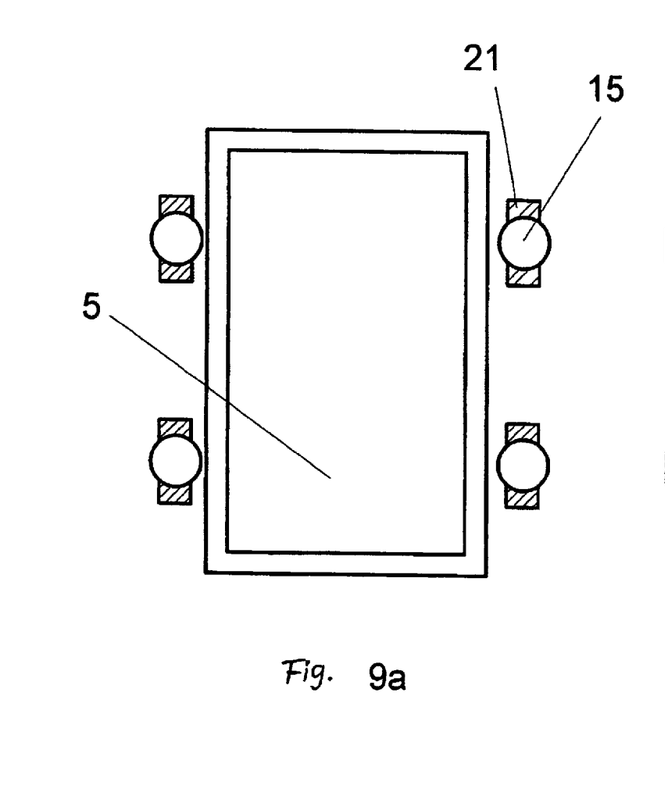
FIGS. 9a and 9b are a section through the stack magazine of FIGS. 8a and 8b.
Figure 9B:
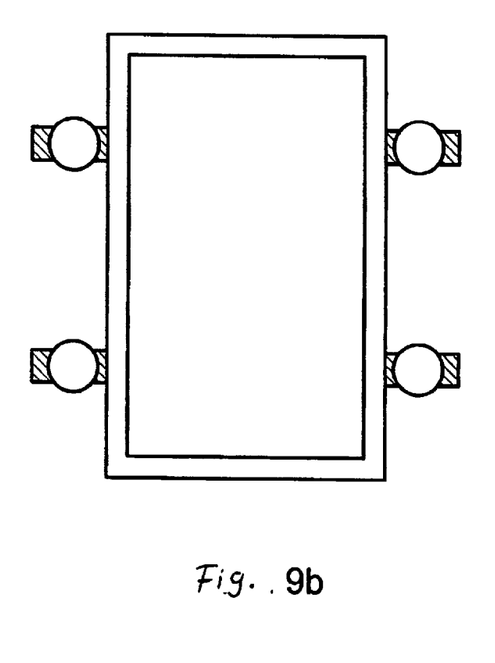

FIGS. 8a and 8b show in side view and FIGS. 9a and 9b show in plan view a production machine with a stationary stack magazine located at this, into which stack magazine 15 the produced products are slid and in which such product stacks are formed. Barriers 21 with which a completely formed and to-be-dispensed product stack 5 can be separated from products subsequently produced by the deep-draw machine 14 that form an additional stack are directed into the guide rods of the stack magazine 15. The barriers 21 or spacer elements are borne via a sliding guide on or in the guide rods of the stack magazine 15. The barriers 21 or spacer elements are introduced into the movement region of the products or, respectively, product stacks 5 via 90° rotation of the guide rods. The point in time at which the product stack 5 in the stack magazine possesses the desired product count is marked in FIG. 8a. At this point in time the barriers 21 are pivoted into the region of the products or, respectively, of the product stacks 5 so that the subsequently produced products inserted into the stack magazine 15 are, as stated, separated from the finished product stack 5. While the release position in which the product stack is formed unhindered is shown in FIG. 9a, this pivoted position 9a of the barriers 21 is shown in FIG. 9b.

In the situation shown in FIG. 8b, the situation is depicted after three additional machine actions in which three additional products have thus respectively been inserted into the stack magazine 15.

The barriers 21 or spacer elements can even be activated by gravity in the case of a vertical stack magazine 15. Given an angled or horizontal arrangement of the stack magazine, the barriers 21 or spacer elements are pretensioned via a spring (not shown). The spring itself is then integrated into the guide rods.

As an alternative to the shown embodiment in which the barriers are directed in the guide rods of the stack magazine, a separate, additional guide system could also be provided for the barriers.

For example, the additional processing contains a packaging of the individual product stacks 5 at a packing machine 16 into plastic bags or sleeves accommodating said stacks 5. For this purpose, the transfer device 1 according to the invention is initially deposited on its side, for example, i.e. with a side wall 3 or 4 on a lifting station 17 (FIG. 10) that is moved to such a height that in this horizontal position the lower region of the product stack 5 is arranged approximately at the height of a receiving surface 16.1 of the packing station 16. The releasing elements 11 (already mentioned above) provided at the packing station 16 move against the closure elements 10 so that these release the edges of the products of the corresponding product stack 5 so that this can be slid out by an external slider 16.2 acting on the plates located at the base 2 of the transfer device 2 (which slider is located at the receiver plate 16.1) into the packing station 16 or, respectively, onto the receiver plate 16.1 of said the slider 16.2. The sliders 16.2 thereby engage at the engagement elements 12.6 (described above) arranged at the plates 12 overlapping the contour of the transfer device 1.

In the exemplary embodiment shown in FIG. 10, the lifting station 17 is subsequently lowered until the middle stack 5 shown there arrives at the level of the receiving surface 16.1 and this stack (and finally the uppermost stack after further lowering of the lifting station 17) is slid out in the same manner.

Figure 11:
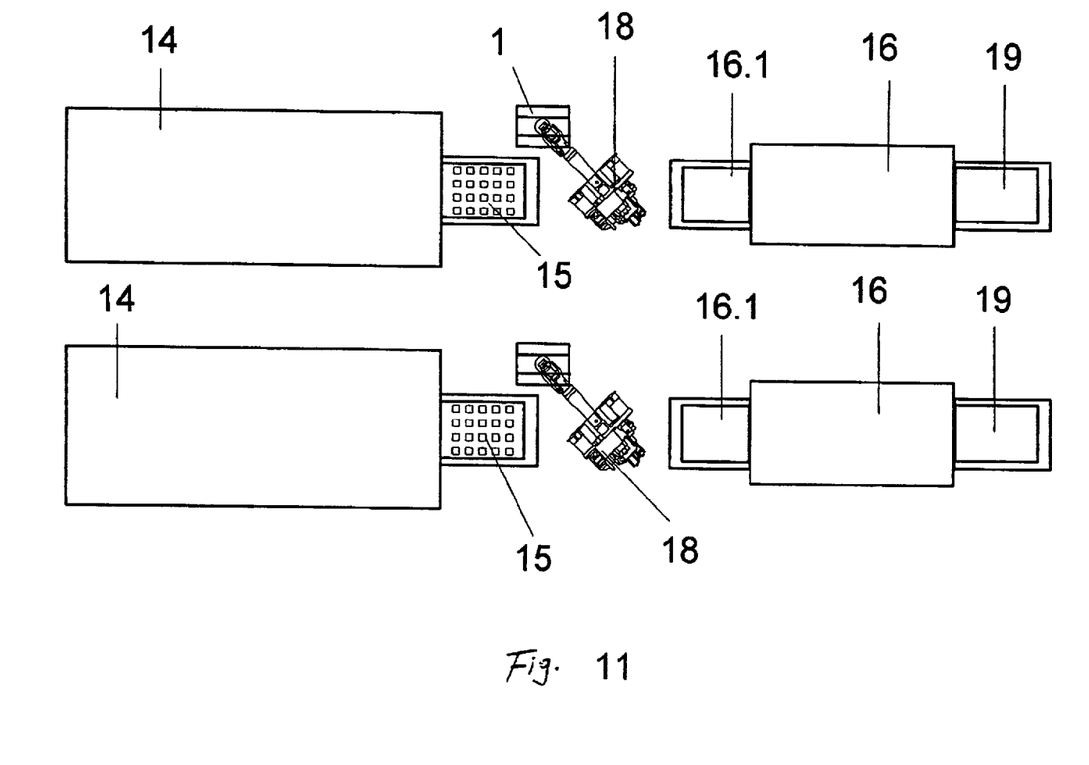
FIG. 11 is a layout representation of a device according to the invention for the implementation of the method given high capacities of the deep-draw machines.
Figure 12:
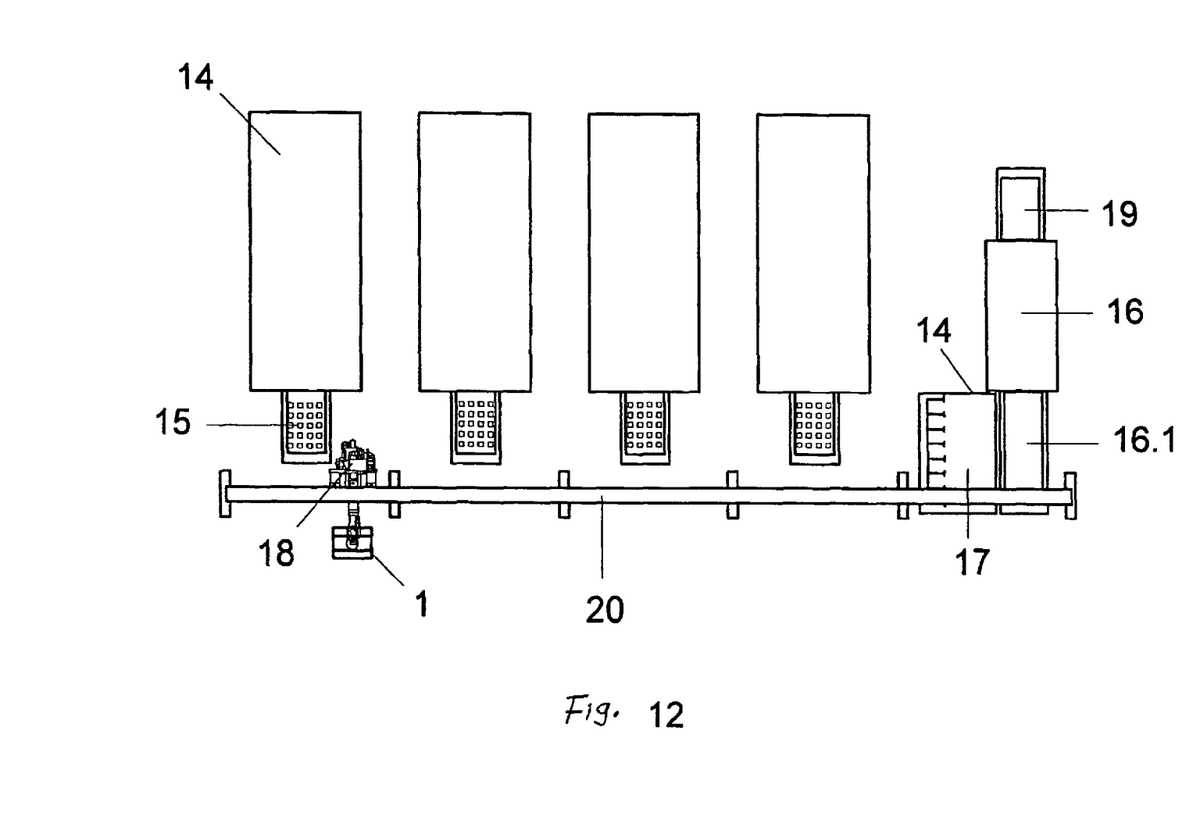
FIG. 12 is a layout representation of a device according to the invention for the implementation of the method at medium and low capacities of the deep-draw machines.

FIGS. 11 and 12 show complete layouts for the implementation of the method according to the invention. In the embodiment of FIG. 11, two complete product lines are arranged next to one another. Each product line consists of a production machine (such as a deep-draw machine 14) with a respective stack magazine 15, a robot 18 that bears a transfer device 1, a packing machine 16 to accept the transfer devices 1, and a discharge station 19 to discharge the packaged product stack 5. If the transfer device 1 is continuously coupled to the robot 18, a separate lifting station (FIG. 10) is not required. The lifting movement ensues via the robot 18. An external slider 16.2 (not shown) is additionally required.

Such an arrangement in which a packing machine is associated with every production machine is reasonable for production machines (deep-draw machines) of high capacity. If the production machines or, respectively, deep-draw machines 14 do not have a high capacity, it is also possible to associate one packing machine 16 with multiple deep-draw machines 14, as this is shown in FIG. 8 where four deep-draw machines are associated with one packing machine 16. Here a linear axle 20 along which a manipulation apparatus (such as a robot 18) can be moved is provided along the stack magazines 15 of the deep-draw machines 14 arranged next to one another, which manipulation apparatus moves the transfer devices back and forth between the deep-draw machines 14 and the packing machine 12, wherein an intermediate storage (not shown) in the region of the packing machine 16 can also possibly be present so that the robot 18 can already retrieve an additional transfer device 1 filled with product stacks while a previously deposited transfer device 1 is emptied at the packing machine, which previously deposited transfer device 1 the robot can then pick up again to receive additional product stacks at one of the deep-draw machines 14.

Although modifications and changes may be suggested by those skilled in the art, it is the intention of the inventors to embody within the patent warranted heron all changes and modifications as reasonably and properly come within the scope of their contribution to the art.

We claim as our invention:

1. A device to transfer product stacks, comprising:
a discharge station at which product stacks are present;
a receiver station to which said product stacks are to be transferred;
a transport device operable to move said product stacks from said discharge station to said receiver station;
a transfer device comprising a transfer device housing having a connection element configured to connect said transfer device to said transport device;
said transfer device housing comprising a plurality of receiver regions each configured to receive a product stack therein, each receiver region being bounded by guide elements forming components of said transfer device housing, each guide element comprising a spring-loaded closure element, and each of said receiver regions comprising a plate that is movable by spring loading, along a direction of the guide elements in the receiver region, on the closure elements in the receiver region; and
said receiver station comprising release elements that engage said closure elements upon said transfer device arriving at said receiver station, to allow said product stacks to remain at said receiver station after said transfer device is removed from said receiver station each release element being operable by a slider engageable with one of said plates, said slider being pneumatically or electrically driven at said receiver station.

2. A device as claimed in claim 1 wherein said discharge station is a deep-draw machine, and wherein said receiver station is a packing machine.

3. A device as claimed in claim 1 wherein said transport device is an industrial robot.

4. A device as claimed in claim 1 wherein each of said receiver regions comprises an engagement element that engages said slider.

5. A device as claimed in claim 1 wherein each receiver region has axes of symmetry, and wherein said guide elements are located substantially on said axes of symmetry.

6. A device as claimed in claim 1 wherein each of said plates comprises an engagement element configured to engage with an external slider to release the closure element associated therewith.

7. A device as claimed in claim 6 wherein each engagement element projects beyond an exterior of said transfer device housing.

8. A device as claimed in claim 7 wherein said transfer device housing comprises slots therein at said exterior thereof, said slots proceeding along said guide element direction, and said engagement elements being directed in said slots.

9. A device to transfer product stacks, comprising;
a discharge station at which product stacks are present;
a receiver station to which said product stacks are to be transferred;

a transport device operable to move said product stacks from said discharge station to said receiver station;

a transfer device comprising a transfer device housing having a connection element configured to connect said transfer device to said transport device;

said transfer device housing comprising a plurality of receiver regions each configured to receive a product stack therein, each receiver region being bounded by guide elements forming components of said transfer device housing, each guide element comprising a spring-loaded closure element, comprising a sheath cable spring loads a respective plate in the respective receiver stations, and each of said receiver regions comprising a plate that is movable by said spring loading, along a direction of the guide elements in the receiver region, on the closure elements in the receiver region, and said transfer device housing comprising a housing base with a tension spring located at said housing base, and comprising a plurality of deflection rollers that respectively guide said sheathed cables from each of said plates in the respective receiver regions to said tension spring; and said receiver station comprising release elements that engage said closure elements upon said transfer device arriving at said receiver station, to allow said product stacks to remain at said receiver station after said transfer device is removed from said receiver station.

* * * * *